Figure 1:
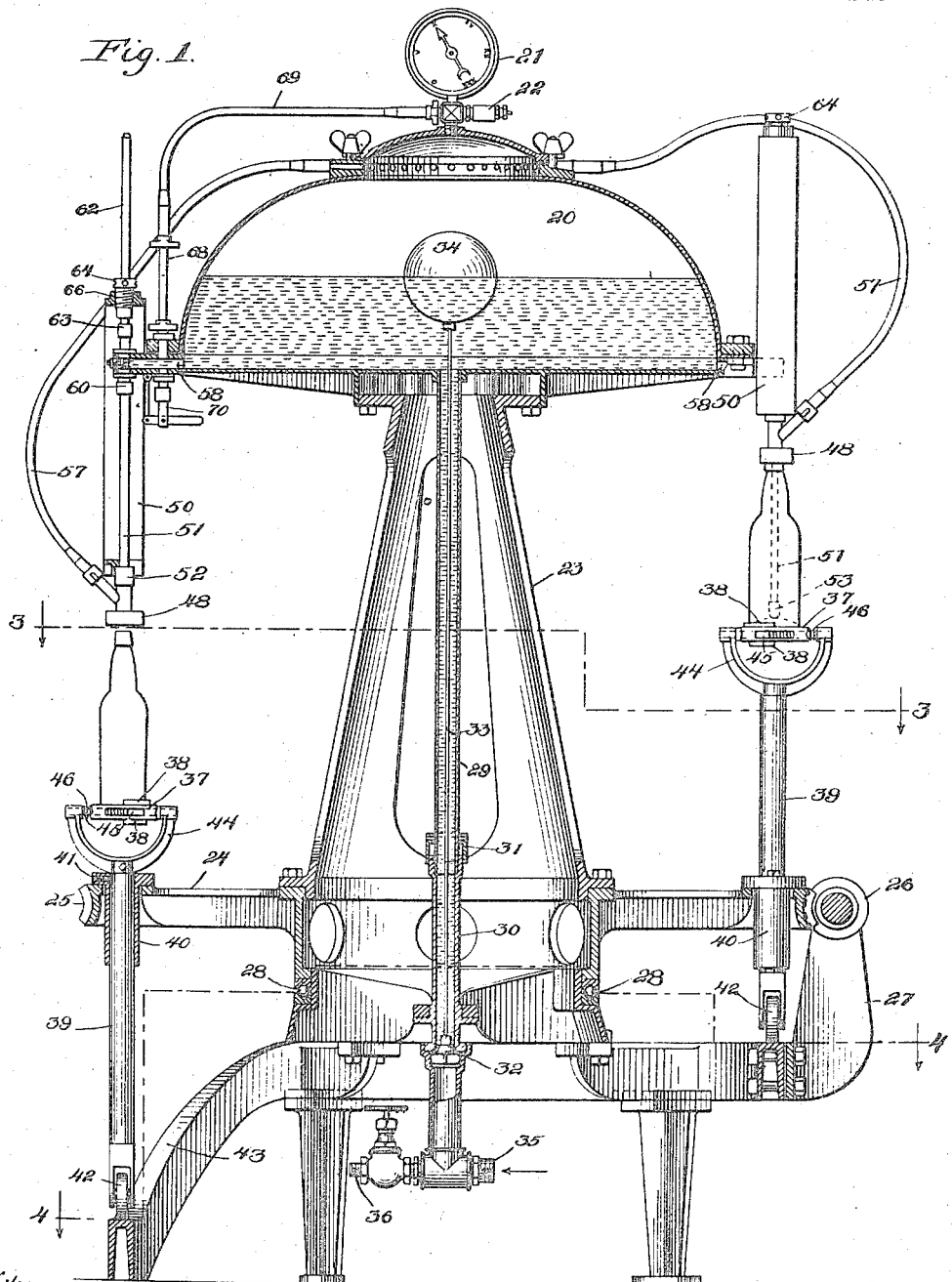

No. 755,619. PATENTED MAR. 29, 1904.
H. W. COLBY.
BOTTLING MACHINE.
APPLICATION FILED MAR. 31, 1902.
NO MODEL. 6 SHEETS—SHEET 1.

Witnesses:
Wm. Geiger
[signature]

Inventor:
Harry W. Colby.
By
Munday, Evarts & Adcock.
Attorneys

No. 755,619. PATENTED MAR. 29, 1904.
H. W. COLBY.
BOTTLING MACHINE.
APPLICATION FILED MAR. 31, 1902.
NO MODEL. 6 SHEETS—SHEET 2.

Witnesses: Inventor:
Harry W. Colby
By
Munday, Evarts & Adcock.
Attorneys

No. 755,619. PATENTED MAR. 29, 1904.
H. W. COLBY.
BOTTLING MACHINE.
APPLICATION FILED MAR. 31, 1902.
NO MODEL. 6 SHEETS—SHEET 3.

Witnesses.
Wm Geiger
H. W. Munday

Inventor:
Harry H. Colby,
By Munday, Evarts & Adcock.
Attorneys

No. 755,619. PATENTED MAR. 29, 1904.
H. W. COLBY.
BOTTLING MACHINE.
APPLICATION FILED MAR. 31, 1902.
NO MODEL. 6 SHEETS—SHEET 4.

Witnesses:
Wm. Geiger
N. W. Munday

Inventor:
Harry W. Colby.
By Munday, Evarts & Adcock.
Attorneys

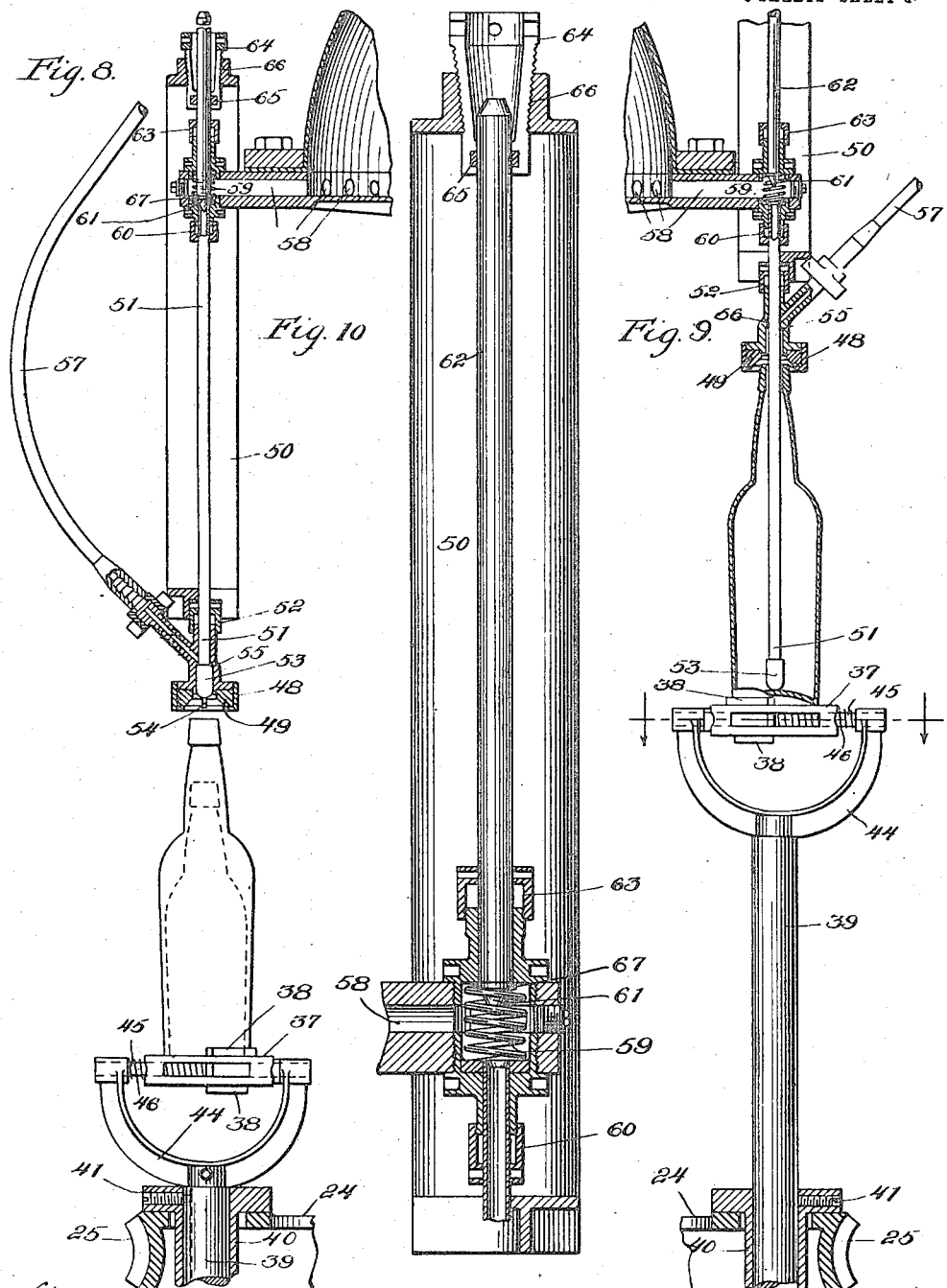

No. 755,619. PATENTED MAR. 29, 1904.
H. W. COLBY.
BOTTLING MACHINE.
APPLICATION FILED MAR. 31, 1902.
NO MODEL. 6 SHEETS—SHEET 6.
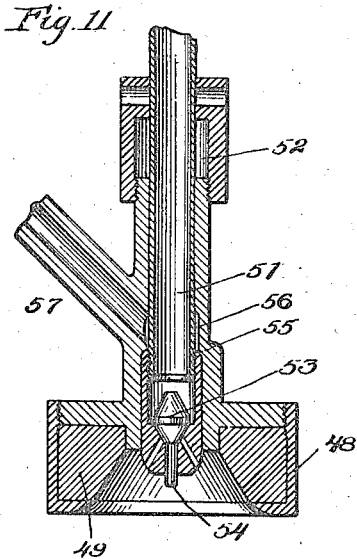
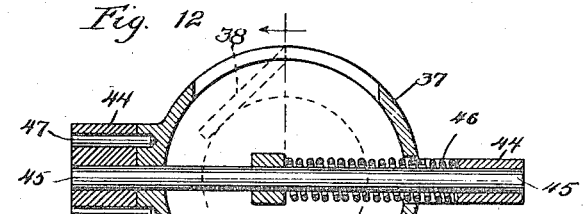
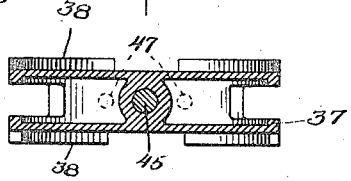
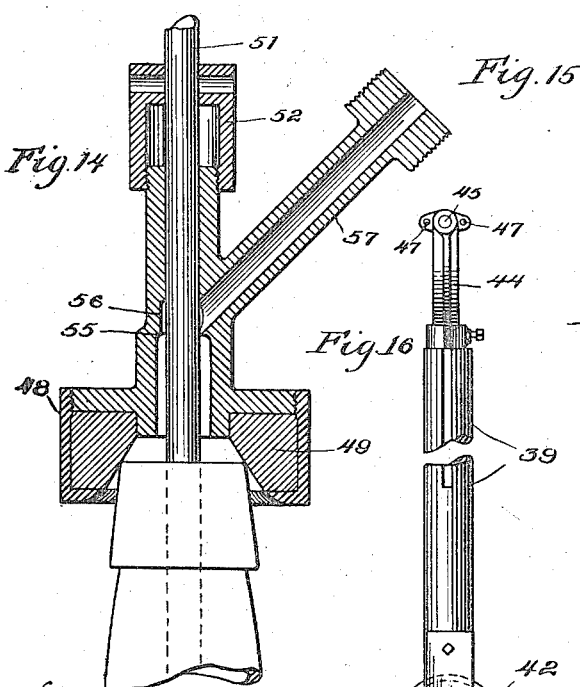
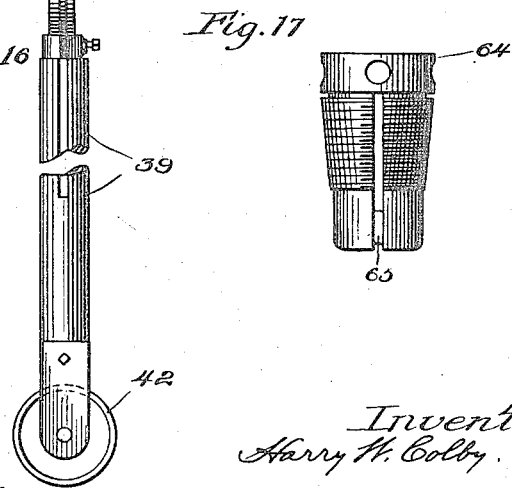
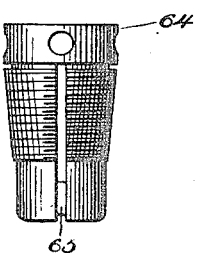
Witnesses:
Wm. Geiger
H. W. Munday
Inventor:
Harry W. Colby.
By Munday, Evarts & Adcock.
Attorneys No. 755,619.                                              Patented March 29, 1904.

UNITED STATES PATENT OFFICE.

HARRY W. COLBY, OF CHICAGO, ILLINOIS, ASSIGNOR TO AUTOMATIC RACKING MACHINE COMPANY, OF CHICAGO, ILLINOIS, A CORPORATION OF ILLINOIS.

BOTTLING-MACHINE.

SPECIFICATION forming part of Letters Patent No. 755,619, dated March 29, 1904.

Application filed March 31, 1902. Serial No. 100,651. (No model.)

*To all whom it may concern:*

Be it known that I, HARRY W. COLBY, a citizen of the United States, residing in Chicago, in the county of Cook and State of Illinois, have invented a new and useful Improvement in Bottling-Machines, of which the following is a specification.

This invention relates to an improvement in automatic bottling-machines.

The machine is especially designed for use in filling bottles with gas-charged liquid under pressure, and more especially intended for use in filling bottles with such carbonated beverages as are likely to form troublesome foam—such, for example, as ordinary beer, where the foam once formed is persistent and will interfere with the complete filling of the bottle. Where gas-charged beer while being filled into the bottles is unduly agitated in such manner as to cause the gas to rise violently through the beer and form foam, there is a tendency to make the beer "wild," as it is termed, so that the cork or seal is with difficulty inserted, and sometimes a large proportion of the beer is lost by foaming out before the bottle can be corked or sealed, and if a certain amount thus escapes this requires the bottle to be refilled, and a large amount of beer is thus wasted.

In the present invention it is the object to automatically fill the bottles rapidly and consecutively, but in such manner that the beer will be entirely quiet, so that the bottle may be subsequently corked or sealed by hand or otherwise without creating any foam or wildness in the beverage throughout the entire operation; and with this main object in view the invention consists in the novel devices and parts and combination of parts and devices hereinafter described, and shown in the drawings, and having the mode of operation set forth.

Figure 2:
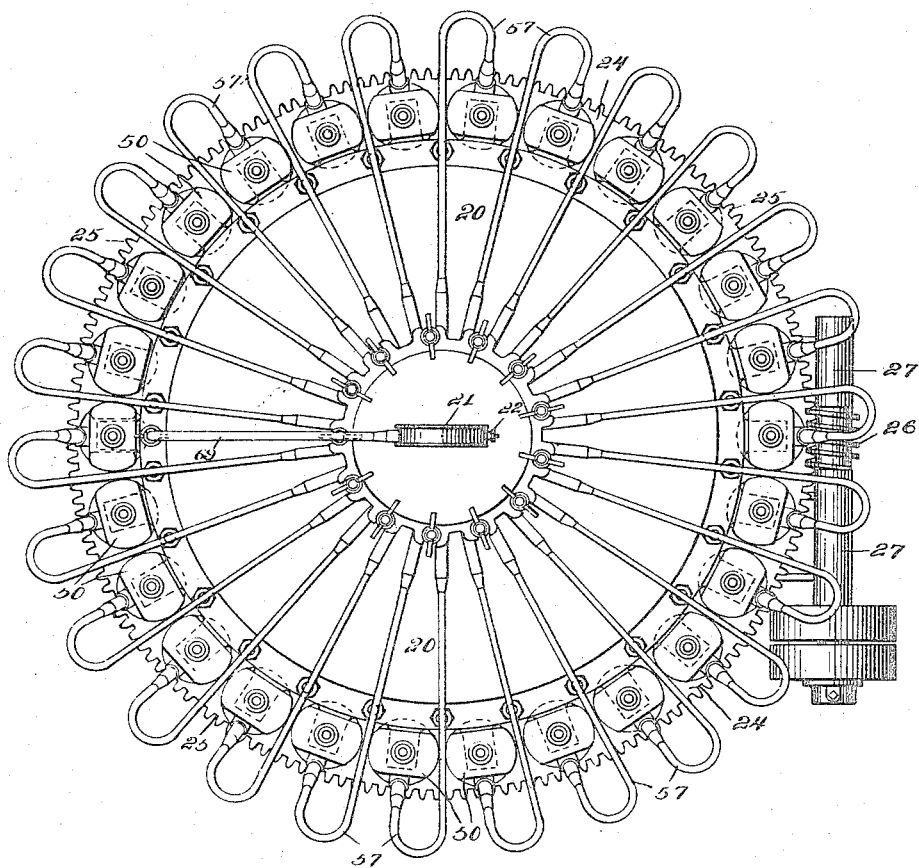
Figure 3:
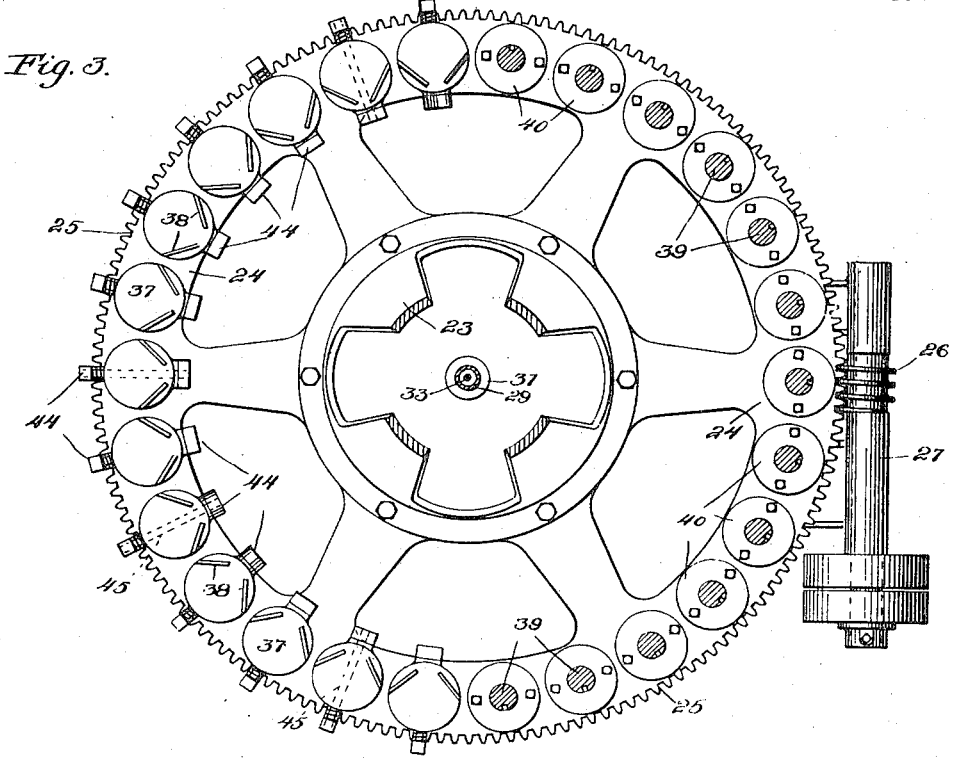
Figure 4:
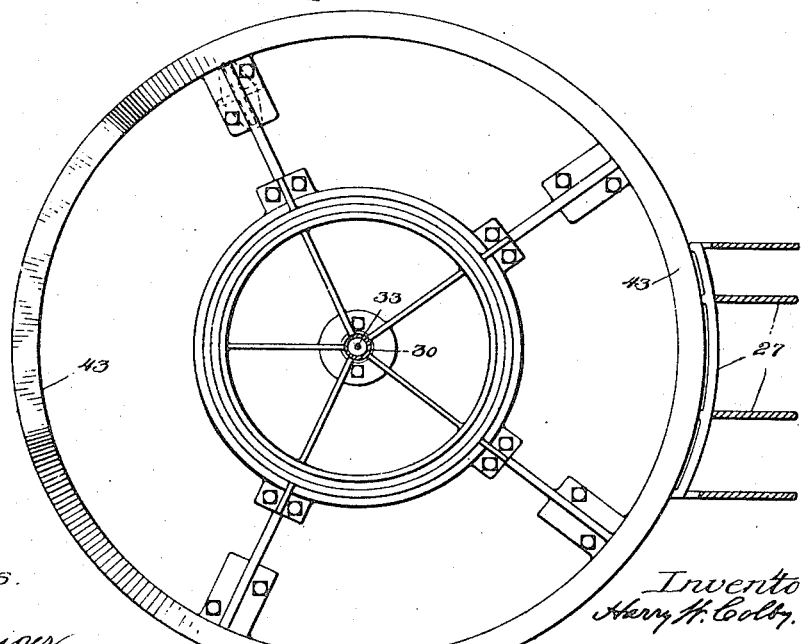
Figure 5:
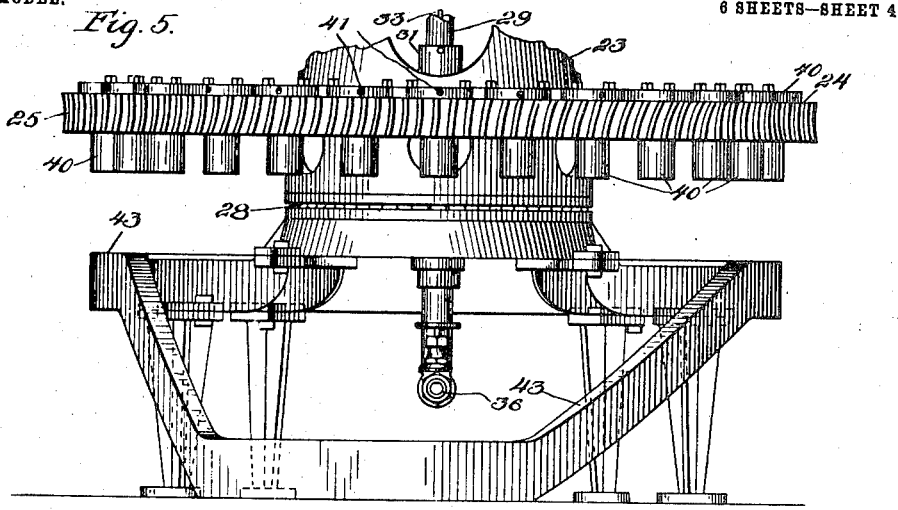
Figure 6:
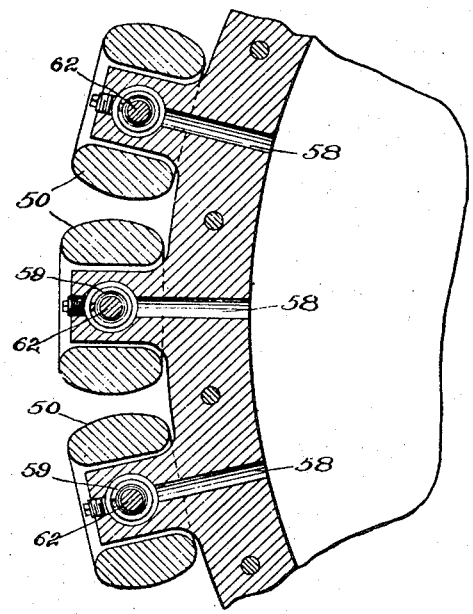
Figure 7:
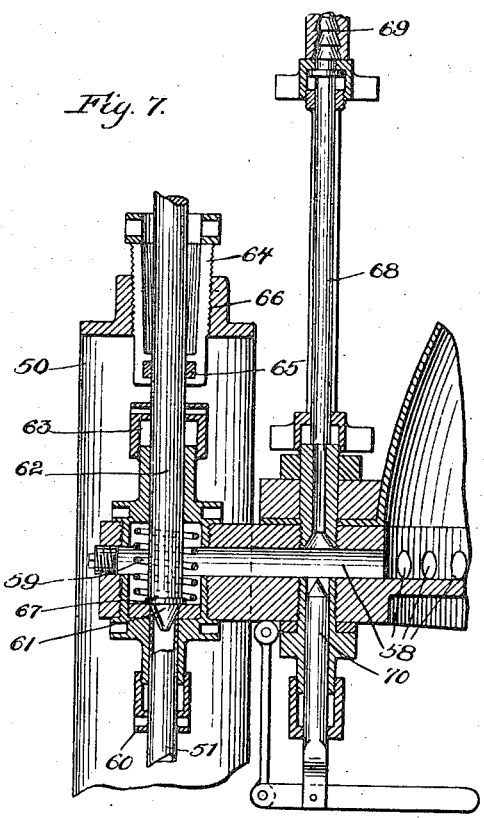

In the accompanying drawings, which form a part of this specification, Figure 1 is a sectional elevation of my improved machine. Fig. 2 is a top or plan view of said machine. Fig. 3 is a horizontal section of the same on the line 3 3 of Fig. 1. Fig. 4 is a similar section on the line 4 4 of Fig. 1. Fig. 5 is a side elevation of the rotary bottle-carrier and the cam-track. Figs. 6, 7, 8, 9, 10, 11, 12, 13, 14, 15, 16, and 17 are detail views of the various parts of the mechanism, drawn upon a somewhat larger scale than the preceding figures.

Like characters are employed to designate like parts in all of the figures of the drawings.

In said drawings, 20 is the beer-reservoir, made capable of holding beer under pressure. This reservoir is preferably provided with a pressure-gage 21 for indicating the gaseous pressure of its contents and also with relief-valve 22 of the ordinary safety-valve type, which may be set to blow off or relieve the pressure at any predetermined point. The reservoir 20 is mounted on a rotary carriage or support 23, to which is connected the circular framework or rim 24, the periphery of which is shown in the drawings to be provided with the worm-gear 25, meshing with the screw-pinion 26, the latter having bearings in the stationary framework 27 of the machine, said screw-pinion being mounted on a shaft provided with a tight and loose pulley for driving it from any prime mover. To facilitate the rotation of the reservoir and the rotary framework, the latter is mounted on ball-bearings 28 on the stationary part of the frame. Although I prefer to employ ball-bearings on account of the absence of friction and steadiness of movement, which obviates all danger of agitating the beer in the reservoir or bottles, any ordinary form of bearing and any ordinary form of gearing which will permit and cause the reservoir to be rotated steadily and smoothly without producing any agitation of the beer in the reservoir or bottles, which may be produced by the intermittent movement of a ratchet, will answer the purpose. From the bottom of the reservoir and in the axis of its rotation the pipe 29 is led down to the pipe 30, the latter being stationary, and the two pipes are joined together by the stuffing-box 31 to permit the rotation of the reservoir. In the pipe 30 is a valve 32, constructed to close said pipe by an upward movement. The stem 33 of this valve is connected to a float 34, which latter floats in the beer and closes the valve, holds it closed when the beer is at a certain height, and maintains the level of the beer during the operation of the machine. To the lower end of the pipe 30 is affixed the beer-ingress 35, to which is joined a pipe (not shown) leading to the beer-supply. The beer flows into the pipe 30 through the valve 32 and up into the reservoir until the predetermined height is reached, when the float being lifted the supply will be cut off by the valve until beer is drawn from the reservoir in the manner hereinafter to be described, when the sinking of the float will again open the valve and permit the flow to be renewed, thus maintaining the beer in the reservoir always at a certain predetermined level. As the rising of the beer in the reservoir at the beginning may not induce in the said reservoir the requisite degree of atmospheric pressure, I provide a compressed-air ingress 36, connected to an air-pump or other suitable supply of compressed air, and before the beer is first admitted in the reservoir I let in a supply of compressed air until the pressure-gage indicates the required degree, and this cannot be exceeded, because the relief-valve 22 should be set to blow off when this point is passed. The required pressure in practice varies considerably, due to how highly the beer may be charged with carbonic-acid gas and also the temperature of the beer, and will also vary from, say, five to fifteen pounds and upward per square inch in excess of the atmospheric pressure, and in every case the relief-valve should be correspondingly preadjusted. When this pressure is reached in the reservoir, the air-supply is immediately cut off, and thereafter during the operation of the machine no further attention need be paid to the control and regulation of said pressure unless the condition of the beer shall itself change, which is not likely to happen. It will be noted at this point in the description that the construction and operation of the mechanism is such, as will be subsequently explained, that as the beer from the reservoir flows by gravity into the bottle the air in the bottle is thereby driven out and into the reservoir above the beer, so that the initial pressure in the reservoir is always maintained, in fact a surplus being created by this operation, which escapes from time to time through the relief-valve, thereby maintaining an approximately constant pressure in the reservoir. By this means of maintaining the pressure in the reservoir the air which is supplied to said reservoir in the continued operation of the machine, it will be seen, is always air which has been in intimate contact with the beer and is displaced from the bottles by the beer itself, so that any portion of the carbonic-acid gas in the beer that has been set free—and there is always some—will mingle with the air supplied to the reservoir and will enter the latter therewith, and this gas being heavier than air will tend to settle to the bottom and form a layer immediately over the beer, which layer will gradually increase in depth as the machine is operated and more and more bottles are filled, because it will be remembered the relief-valve is in the upper part of the reservoir, and the carbonic acid itself will not blow out, but rather the air above it, and this accomplishes a very important result in shielding the beer from the access of germs that may be contained in the atmosphere. Germs floating in the air will be necessarily lighter than gas-charged air itself, and the tendency would be for them to remain in the upper layer and not to penetrate through the heavier layer of carbonic acid. This overcomes a very serious objection which has heretofore been made to the use of an atmospheric counter-pressure in the filling of bottles, as it has been noticed that the bottles so filled did not always possess the keeping qualities desired, and I believe the cause of this is traceable to the germs introduced into the beer from the outside air. In my machine this difficulty is not experienced. Moreover, in my machine as the filling of the bottles proceeds the air in the reservoir becomes more and more charged with carbonic acid picked up by contact with the beer, and therefore becomes less absorbent itself of the gas, so that after the filling operation has been continued for a short time the air will pick up less and less of the carbonic-acid gas at each charge of gaseous fluid into the bottles, leaving, therefore, more gas in the beer, and this overcomes another objection which has been made to the use of air as a counter-pressure in filling-machines, in which the air is constantly changed instead of being partly used over and over again as in my machine. In my machine the air becomes saturated with the gas and gradually less absorbent instead of remaining constantly absorbent and carrying off the gas.

On the rotating rim 24 are mounted a series of bottle-supports, each consisting of a disk 37, having the bottle-centering angle-pieces 38 38 for centering the bottle. These bottle-supporting disks are fixed to the upper end of a rod 39, which passes through a guide-sleeve 40, carried by the rim 24, and through this guide-sleeve a pin or screw 41 passes, its end entering a slot in the rod, so that the rod and the disk it carries is held from turning, while the rod is still free to slide up and down in the sleeve and carry the bottle with it. The lower end of each rod is fitted with a roller 42, which rides upon the stationary cam-track 43. This cam-track 43, which may be seen in elevation in Fig. 5, is made horizontal in the largest portion of its circular course, but has a dip—that is to say, a downward incline—leading to a lower level, a horizontal portion at the lower level, and then an upward incline again to the higher level. The result is that a bottle may be placed upon the support while the lower level is being traversed, and the bottle will be then automatically raised, carried around at the higher level, and then brought again to the lower level. The purpose of this movement is to bring the empty bottle up into contact with a sealing-head connected to and moving with the rotating reservoir, hold it there while the bottle is being filled from the reservoir, and thereafter lower said bottle out of contact with said sealing-head, so that the bottle may be removed and corked or sealed.

The bottles to be filled are usually of two sizes—quarts and pints—and these sizes are not only different in length, but also different in diameter, so that the centering device for the larger bottles would not operate to center a bottle of smaller diameter. As a convenient means of changing the centering devices on the bottle-supporting disk I make said disk reversible, so that it can be provided with a centering device on each face, one face serving for the quart size and the other for the pint size. To accomplish this, I fix the disk 37 to the top of the rod 39 by means of a yoke 44. A pivot 45 passes through the yoke and through the disk for the latter to turn upon. A spring 46 holds the disk into contact with one of the arms of the yoke normally, and in this arm are two pins 47 47, that enter holes in the disk to prevent the latter from turning when in this position; but if the disk is pushed over against the spring, sliding on its pivot, the detent-pins will be released, and then the disk may be turned the other side up, bringing the other centering device into position for use. By this simple contrivance the operator who is engaged in inserting and removing the bottles to be filled may instantly change from one sized bottle to another without requiring to stop the machine to make an adjustment.

Immediately above each bottle-support and concentric with its centering device and rotating with the bottle-support and the reservoir and supported from the reservoir or its framework is located a sealing-head 48 for each bottle-support. This sealing-head is made with a conical mouth lined with a rubber packing or other yielding material 49, so that when the neck of the bottle encounters it an air and gas tight union is formed. As the bottle-support is raised by the action of the cam-track it encounters this sealing-head and lifts the same upward with it, a weight 50 being mounted on the sealing-head to insure the necessary force for a sealing contact between the bottle and the head and to insure the return of the sealing-head with the bottle when the latter descends with its support, maintaining the seal until the bottle is finally lowered to nearly its lowermost position. This weight is of itself of novel construction, and by its use an almost uniform and constant pressure is exerted on the sealing-head, so that when it is lifted up and down it has only to overcome the slight friction of the packing and its friction-nut at its upper end. Within the sealing-head is the filling-tube 51, and upon which filling-tube the sealing-head slides in rising, a stuffing-box 52 insuring a gas and liquid tight joint between the two. At the lower end of the filling-tube is a valve 53, having a stem 54, which projects below to encounter the bottom of the bottle as the latter rises, and thus to open said valve when the bottle has risen to its uppermost position. The lower portion of the filling-tube is somewhat enlarged to constitute a shoulder 55 to close the air-cavity 56, which communicates with the reservoir, the closing being effected when the sealing-head is in its lowermost position. From this air-cavity 56 a flexible pipe 57 leads from each of the sealing-heads to the top of the reservoir, so that the air-cavity in the sealing-head is constantly in communication with the reservoir, no matter what the position of the sealing-head may be. The flexibility of the pipe 57, which may be made of hose, permits the rise and fall of the sealing-head. The upper end of the filling-tube 50 is connected to a passage-way 58, which communicates directly with the lower part of the reservoir, so that the beer can flow from the reservoir and stand constantly in all the filling-tubes. The bottoms of the bottles are not always of the same thickness, due to some uncertainty in their method of manufacture—that is to say, the inside of the bottom of the bottles at that point where the valve-stem of the valve at the bottom of the filling-tube strikes and where the bottom of the filling-tube may itself come into contact with the glass is not always at the same height above the bottle-support—and I therefore find it desirable to provide some means for compensating for this variation, for otherwise the bottle might be broken or the filling-tube bent. To afford this compensation, I provide a sliding connection between the upper end of the filling-tube and the passage 58 and provide a spring 59 to hold the filling-tube down. If the bottom of the bottle should be too high, the rise of the bottle will lift the filling-tube itself for a short distance against this spring, and the latter will return the filling-tube to its former position when the bottle is lowered. The sliding connection between the upper end of the filling-tube and the passage 58 is made gas and liquid tight by a stuffing-box 60.

It sometimes happens that a bottle is cracked or defective or is too weak to stand the operation of filling and breaks while the beer is flowing into it and the valve at the lower end of the filling-tube would not close, due to the fact that the bottom of the bottle would remain in contact with the valve-stem, holding it open while rotating on the upper cam-track, as the body or neck of the bottle is the usual parts that break when under a counter pressure, and in such case if there be not some provision to prevent it the beer may continue to flow out and waste. To prevent this, I have provided a valve 61, which is seated on the upper end of the filling-tube and closes the entrance of beer thereto. The stem 62 of this valve is composed of a relatively large rod, which passes up through a stuffing-box 63 and extends up for a considerable distance, being connected by a friction device with the weight 50. This friction device consists of a split conical nut 64, provided with a frictional bearing-ring 65, said nut being tapped into a screw-threaded cavity 66 in the upper portion of the weight 50. By turning the split nut in one or the other direction the frictional contact between the weight 50 and the rod 62 may be adjusted to a greater or less amount. It will be remembered that the weight 50 rests upon the sealing-head and is lifted thereby when the bottle comes into contact with the said head and lifts it. Now when this takes place the frictional grip between the weight and the rod 62 is sufficient to lift the rod, and thus open the valve 61 at the first upward movement of the sealing-head. As the upward movement of the sealing-head continues a shoulder 67 on the rod 62 will encounter the upper side of the passage 58, and thus stop the further upward movement of said rod and valve after the latter has been fully opened, and thereafter the sealing-head in its further rise lifting the weight 50 will cause it to slide on the rod 62, which then serves as a guide for the weight. Now it will be seen that if a bottle shall break and the sealing-head shall fall through a very short distance the valve 61 will thereby be made to close and the waste of beer cut off. It is possible to control the flow of beer through the filling-tube by the valve at the upper end of the filling-tube by the means shown and described and without a valve at the lower end of the filling-tube; but by this means alone some foam and liberation of carbonic-acid gas will take place, due to the fact that the filling-tube when not in actual use filling the bottle on the higher cam-track would remain open to the atmosphere when directly above the lower cam-track, and this condition would cause the gas in the beer to expand and escape therefrom, as well as cause this portion of the beer to become lively or wild, and thus producing some foam in the next bottle to be filled. It must be remembered that carbonic-acid gas is charged into the liquid under pressure above atmosphere, and any exposure to the atmosphere of such gas-charged liquids will cause or allow the gas to escape therefrom. If this gas-charged liquid upon which the pressure has been released should be agitated, foam will be made, even though such agitation is caused by the simple moving of the beer through the filling-tube. This is true even though the pressure between the inflowing beer and the next package to be filled has been equalized, and the flow of the beer is due to gravity force alone.

It is true that all bottling-machines that up to the present time have been useful to the art are so constructed that by some means a valve outside of the bottle is so arranged and operated as to control the beer flowing through the filling-tube. The usual and only bottle-filling machines, so far as I know, actually in use in the United States to-day are those operated by hand means and having a siphon method of passing the beer from one receptacle to another either under a counter-pressure or at atmospheric pressure. The former method is objected to as being too slow in operation, due to the means employed, and the latter method is objectionable in so far as that too much of the carbonic-acid gas is released from the beer during the filling operation; but in either case some foam and loss of gas takes place due to the imperfect conditions already mentioned. I have therefore made a machine to overcome these and other objections principally by using a valve at the lower end of the filling-tube in such a way that it can only be opened when the filling-tube is in close juxtaposition to the bottom of the bottle, so that when the machine is in operation the filling-tube is always full of beer or other gas-charged liquids, so that when the valve is opened the beer will flow into the bottle directly against the bottom thereof and without passing any portion of the beer through the air contained in the bottle at the beginning of the flow from the filling-tube against a counter-pressure equal to the pressure of the beer in the supply-tank, filling the bottle from its bottom upward by a gravity-flow and maintaining the equalized pressure between the tank and bottle throughout the filling operation or until the filling-tube is withdrawn from the bottle, with the result that no foam or release of carbonic-acid gas from the liquid takes place under normal conditions.

To make the operation of filling the bottle more rapid than has heretofore been possible, I have adopted the idea of filling each bottle consecutively in a circle by applying power in such a way that the rotation of the machine may take place without any attention of the operator and any circumference may be used to suit any number of bottles, so that the filling of the bottles may be as rapid as desired and corked or sealed as fast as released from the filling-machine by hand or otherwise. The consecutive filling of bottles is important in so far as that when so filled each bottle may be immediately sealed to prevent any loss of gas which would take place should the filled bottle remain standing unsealed in the open air any appreciable length of time or as would be the result should a number of bottles be filled simultaneously instead of consecutively.

On one of the passages 58 in easy view of the operator I fix a sight-glass 68, the lower end of which may communicate with the said passage 58, and consequently with the beer in the reservoir, and the upper end of which by the pipe 69 communicates with the upper part of the reservoir, and consequently with the gaseous pressure therein contained. A valve 70 is provided to close and open this sight-glass. The purpose of the sight-glass is simply to indicate to the eye the height of the beer in the reservoir.

The operation of the machine is as follows: The reservoir being empty, the operator first turns on the compressed-air supply until the air in the reservoir stands at the predetermined pressure, which will be indicated by the pressure-gage 21 and also, if exceeded, by the relief-valve 22. He then cuts off the air-supply and opens communication between the reservoir and the beer-supply and allows the beer to flow into the reservoir. When the beer in the reservoir has reached a certain height, the float therein will close the valve against the further admission of beer and automatically thereafter control the supply to maintain it at that height. The operator by watching the sight-glass can determine when the reservoir is sufficiently full to begin the filling of the bottles. He then puts the power on the machine through the band-wheel which, rotating the screw-pinion 36, causes the worm-gear 25 to rotate, carrying the bottle-supports and the filling apparatus horizontally around before him with a smooth steady motion. Standing opposite the lowermost position of the bottle-supports he inserts one bottle after another, setting the bottom of each against the centering device. In the farther rotation of the frame the roller 42 rides up the incline and lifts the bottle in contact with the sealing-head, and thereafter continuing to rise the sealing-head is lifted up and the filling-tube enters the bottle. As soon as the filling-tube begins to enter the bottle the air and gas pressure from the reservoir passes by way of the tube 57 into the sealing-head and thence into the bottle, equalizing the pressure between the atmosphere of the bottle and the atmosphere of the reservoir. As the bottle and the sealing-head continue to rise the valve 61 has been opened and the beer flows from the passage 58 into the filling-tube until said tube is filled, and when once filled it remains filled until all the beer is drawn out of the reservoir. When the bottle has reached its uppermost position, the lower end of the filling-tube will be in contact with or in close juxtaposition to the bottom of the bottle, and this will cause the valve 53 to be opened by its valve-stem 54 coming in contact with the glass. If the bottom of the bottle is unusually high or thick and comes into actual contact with the lower end of the filling-tube, said filling-tube will yield upward through its stuffing-box 60 against the spring 59 to prevent the breaking of the bottle or the bending of the tube. The valve at the lower end of the filling-tube being thus opened, the beer will begin to flow by gravity gently and quietly and without agitation or formation of foam into the bottle and will rise against the contained air or gas within the bottle, which stands at the same pressure as the atmosphere in the reservoir, displacing said air and driving it back into the reservoir. This air will have been in contact with the beer and will absorb whatever carbonic-acid gas it is capable of by such contact and will be carried back to the tank. After a number of bottles have been filled the mixture in the tank will be principally carbonic acid, and a germ-proof covering of carbonic acid will lie over the beer to prevent its infection from germs which may be contained in the air in the bottles. As one bottle after another is filled the filled bottles will continue to ride around the upper level of the track quietly and without agitation or formation of foam therein until the descending portion of the track is reached, when the bottle will begin to descend, and at the first part of the descent of the sealing-head the weight 50, by reason of its frictional grip on the rod 62, will close the valve 61 and cut off the beer-supply from the bottle. Thereafter the bottle will continue to descend and the filling-tube be thus gradually withdrawn, the valve at its lower end being closed until the sealing-head has descended, with the bottle, to a point where the enlargement at the lower end of the filling-tube has closed the mouth of the cavity in the sealing-head and cut off the air and gas communication between the bottle and the reservoir, after which the sealing-head ceases to farther descend; but the bottle continues to descend a short distance until it is free from the sealing-head. The operator now removes the filled bottle from the bottle-support, replacing it with an empty one, and the operation as to this bottle is complete. The beer in the bottle so filled is in a quiescent state, due to the method of filling, and will remain so for an appreciable length of time—sufficient to enable the cork or seal to be inserted by hand by an assistant or by a machine, if that is desired—before ebullition and foaming begin.

I use the word "telescoping" to describe the relative sliding of the sealing-head and filling-tube, one of said parts ordinarily being stationary.

What I claim is—

1. In a bottle-filling machine, the combination of a reservoir for containing the liquid under pressure, a series of telescoping filling-tubes and sealing-heads, the former each provided with a valve at its delivery end and the latter sliding on the former to an extent approximately equal to the depth of the bottle to be filled, a series of bottle-supports, means for rotating together said filling-tubes, sealing-heads and bottle-supports, means for equalizing the pressure between the reservoir and the bottles being filled, and automatic means for raising and lowering the bottle-supports, successively, in the operation of the machine, substantially as specified.

2. In a bottle-filling machine, the combination of a rotary reservoir for containing the liquid under pressure, means for rotating said reservoir, a series of telescoping filling-tubes and sealing-heads, the former each provided with a valve at its delivery end and the latter sliding on the former to an extent approximately equal to the depth of the bottle to be filled and a series of bottle-supports, means for equalizing the pressure between the reservoir and the bottles being filled, all of these parts rotating with the reservoir, and automatic means for raising and lowering the bottle-supports, successively, in the operation of the machine, substantially as specified.

3. In a bottle-filling machine, the combination of a rotary reservoir for containing the liquid under pressure, means for rotating said reservoir, an axial ingress for said reservoir and rotating therewith, a stationary liquid-supply pipe jointed to said axial ingress, a valve for controlling the ingress the stem of which passes through said axial ingress, a compressed-air pipe communicating with the said stationary supply-pipe at the outer side of said valve and a float connected to said valve-stem and floating on the liquid contents of the reservoir, substantially as specified.

4. In a bottle-filling machine, the combination of a series of telescoping filling-tubes and sealing-heads, the former each provided with a valve at its delivery end and the sealing-head constructed to slide on the filling-tube to an extent approximately equal to the depth of the bottle to be filled and a series of bottle-supports, means for raising and lowering the bottle-supports, and a yielding means for compensating for the varying thicknesses of the bottoms of the bottles, to prevent the breaking of the same, substantially as specified.

5. In a bottle-filling machine, the combination of a filling-tube and a sealing-head, the former provided with a valve at its delivery end, the sealing-head constructed to slide on the filling-tube to an extent approximately equal to the depth of the bottle to be filled, a bottle-support for lifting the bottle and the sealing-head, said filling-tube being itself made yielding to the upward movement of the bottle-support, and means which will return it automatically to its normal position, whereby the varying thicknesses of the bottom of the bottle are compensated for and the breakage of the bottles avoided, substantially as specified.

6. In a bottle-filling machine, the combination of the filling-tube and the sealing-head, the former provided with a valve at its delivery end and the sealing-head constructed to slide on the filling-tube to an extent approximately equal to the depth of the bottle to be filled, a bottle-support for lifting the bottle and the sealing-head, said filling-tube being itself made yielding in the upward movement of the bottle-support against a spring, substantially as specified.

7. In a bottle-filling machine, the combination of a bottle-support, means for automatically raising and lowering said bottle-support, a filling-tube having a valve at its delivery end, a telescopic sealing-head sliding on said filling-tube to an extent approximately equal to the depth of the bottle to be filled and means for holding said sealing-head down with an approximate equal pressure on the bottle at every position said sealing-head may assume while in contact with the bottle, substantially as specified.

8. In a bottle-filling machine, the combination of a bottle-support, means for automatically raising and lowering said bottle-support, a filling-tube having a valve at its delivery end, a telescopic sealing-head sliding on said filling-tube to an extent approximately equal to the depth of the bottle to be filled and a weight applied to said sealing-head for holding it down, substantially as specified.

9. The combination of a liquid-package support, means for raising and lowering said support, a filling-tube, a movable sealing-head, a valve at the upper end of said filling-tube, a valve-rod connected to said valve, and a frictional connection between said valve-rod and said sealing-head, whereby the larger movement of the sealing-head may be communicated to and transformed into a smaller movement of the valve to open said valve when the sealing-head begins to rise and close said valve when the sealing-head begins to descend, substantially as specified.

10. The combination of a reservoir for containing the liquid under pressure, a movable liquid-package support, means for raising and lowering said support, a filling-tube long enough to extend approximately to the bottom of the package to be filled, a sealing-head having means independent of the filling-tube for communicating with said reservoir, and a valve at the lower end of said filling-tube operable by the movement of said support independently of the sealing-head, substantially as set forth.

11. The combination of a liquid-package support, means for raising and lowering said support, a filling-tube long enough to extend approximately to the bottom of the package to be filled, a valve at the upper end of said filling-tube and a valve at the lower end of said filling-tube, both operated by the movement of said support, substantially as specified.

12. In a bottling-machine, the combination, with bottle-filling devices, of a bottle-support mounted and held in proper relation to said filling devices, having two faces provided respectively with bottle-centering devices of different sizes, and movable to bring either centering device into position for operation, and means for holding the support when adjusted.

13. The combination of a sealing-head having an air-cavity in its lower part and a filling-tube within the sealing-head having an enlargement at its lower end forming an annular valve independent of the liquid-controlling valve to close and open said cavity by the movement of the parts with respect to each other, substantially as specified.

14. The combination of a sealing-head having a pressure-conduit connected therewith and a filling-tube within the sealing-head having its lower portion formed as a valve independent of the liquid-controlling valve, and so constructed that when the lower end of the filling-tube is within the sealing-head it will act as a valve to close the pressure-conduit, substantially as specified.

15. The combination of the passage 58, the filling-tube connected to said passage by the stuffing-box 60, the valve 61 at the upper end of the filling-tube, the valve-rod 62 and the means for operating said rod and the stuffing-box 63, substantially as specified.

16. The combination of the reservoir for containing the beer under pressure, of a series of sealing-heads movable to an extent approximately equal to the depth of the package to be filled, filling-tubes each provided with a valve at its delivery end and bottle-supports, said sealing-heads communicating with the upper part of the reservoir and said filling-tubes with the lower part of the reservoir so that the bottle will be filled under equal pressure with that of the reservoir and a stationary cam-track for raising and lowering the bottles a distance greater than the height of the bottle, substantially as specified.

17. The combination of the stationary cam-track, the bottle-supports raised and lowered by the cam-track, the reservoir and its series of sealing-heads and filling-tubes the former sliding on the latter to an extent approximately equal to the depth of the package to be filled, and the latter each provided with a valve at its delivery end mounted to rotate with the bottle-supports, the axial ingress of the reservoir and the stationary ingress connected thereto by a stuffing-box and a valve in the ingress for opening and closing the same, substantially as specified.

18. The combination with a sealing-head and filling-tube, the former sliding upon the latter, of a valve at the upper end of the filling-tube and a weight applied to the sealing-head and surrounding an extension of the filling-tube with a frictional bearing, whereby the sealing-head is held down upon the bottle in the descent of the latter and the valve at the upper end of the filling-tube is operated, substantially as specified.

19. The combination of a filling-tube and sealing-head the latter movable on the former to an extent approximately equal to the depth of the package to be filled, a valve at the lower end of the filling-tube adapted to be opened and closed by the movement of the bottle, means for moving the bottle and an air-valve formed by contact between the filling-tube and sealing-head, substantially as specified.

20. The combination with the reservoir of a reciprocating sealing-head and filling-tube connected thereto the sealing-head moving on the filling-tube to an extent approximately equal to the depth of the package to be filled, a valve at the lower end of the filling-tube, a reciprocating bottle-support, and means for reciprocating said bottle-support and sealing-head the former to an extent approximately greater than the height of the package to be filled, substantially as specified.

21. The combination of a reservoir for containing the liquid under pressure, a bottle-support and sealing-head movable vertically and horizontally together, a filling-tube having a valve at its lower end and long enough to reach the bottom of the package to be filled, and means for opening and closing the said valve, the said sealing-head having means independent of the filling-tube for communicating with the reservoir, substantially as and for the purpose described.

22. The combination of a sealing-head yielding to an extent approximately equal to the depth of the package to be filled and a bottle-support, of a weight applied to the sealing-head, and a filling-tube having a valve at its lower end for opening and closing it and being long enough to reach approximately to the bottom of the package to be filled, substantially as specified.

HARRY W. COLBY.

Witnesses:
H. M. MUNDAY,
JOHN W. MUNDAY.